United States Patent
Jedrzejczak et al.

(10) Patent No.: US 9,646,601 B1
(45) Date of Patent: May 9, 2017

(54) REDUCED LATENCY TEXT-TO-SPEECH SYSTEM

(71) Applicant: Amazon Technologies, Inc., Reno, NV (US)

(72) Inventors: Jacek Jerzy Jedrzejczak, Gdansk (PL); Krzysztof Franciszek Swietlinski, Sopot (PL); Michal Tadeusz Kaszczuk, Gdansk (PL); Lukasz Maciej Osowski, Gdynia (PL)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 580 days.

(21) Appl. No.: 13/951,825

(22) Filed: Jul. 26, 2013

(51) Int. Cl.
*G10L 13/08* (2013.01)
*G06F 17/21* (2006.01)
*G10L 13/02* (2013.01)

(52) U.S. Cl.
CPC .............. *G10L 13/02* (2013.01); *G06F 17/21* (2013.01)

(58) Field of Classification Search
CPC ...................................... G10L 13/08
USPC ........................................ 704/260
See application file for complete search history.

(56) References Cited

U.S. PATENT DOCUMENTS

| | | | |
|---|---|---|---|
| 2001/0012999 A1* | 8/2001 | Vitale | G10L 13/08 704/260 |
| 2007/0124142 A1* | 5/2007 | Mukherjee | G10L 13/10 704/235 |
| 2008/0059189 A1* | 3/2008 | Stephens | G10L 21/06 704/258 |
| 2009/0299746 A1* | 12/2009 | Meng | G10L 13/04 704/260 |
| 2011/0119572 A1* | 5/2011 | Jang | H04M 1/72561 715/205 |
| 2013/0253926 A1* | 9/2013 | Takahashi | G10L 13/00 704/235 |
| 2014/0200894 A1* | 7/2014 | Osowski | G10L 13/08 704/260 |

* cited by examiner

*Primary Examiner* — David Hudspeth
*Assistant Examiner* — Timothy Nguyen
(74) *Attorney, Agent, or Firm* — Seyfarth Shaw LLP; Ilan N. Barzilay; Christopher A. Baxter

(57) ABSTRACT

In delivering text-to-speech (TTS) results to a user, the time between the user request and delivery of initial TTS results is reduced using one or more of various techniques. Caching of TTS results may be reconfigured to cache unit indices rather than full speech synthesis results. More powerful computing resources may be dedicated to early TTS processing. A user may be notified of TTS results prior to complete processing of a TTS request. Early TTS processing may be performed by a local device and then passed to a remote device.

21 Claims, 10 Drawing Sheets

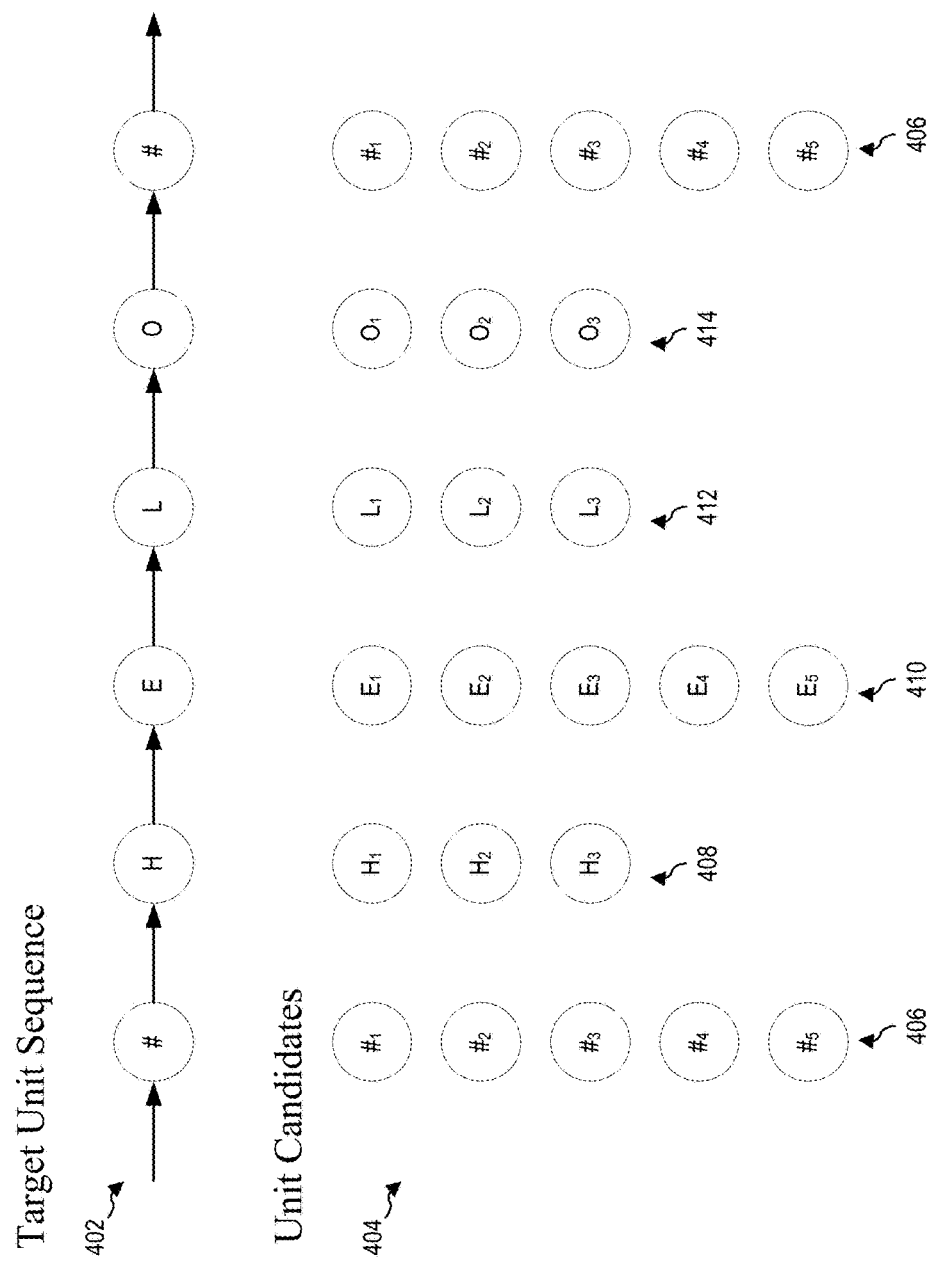

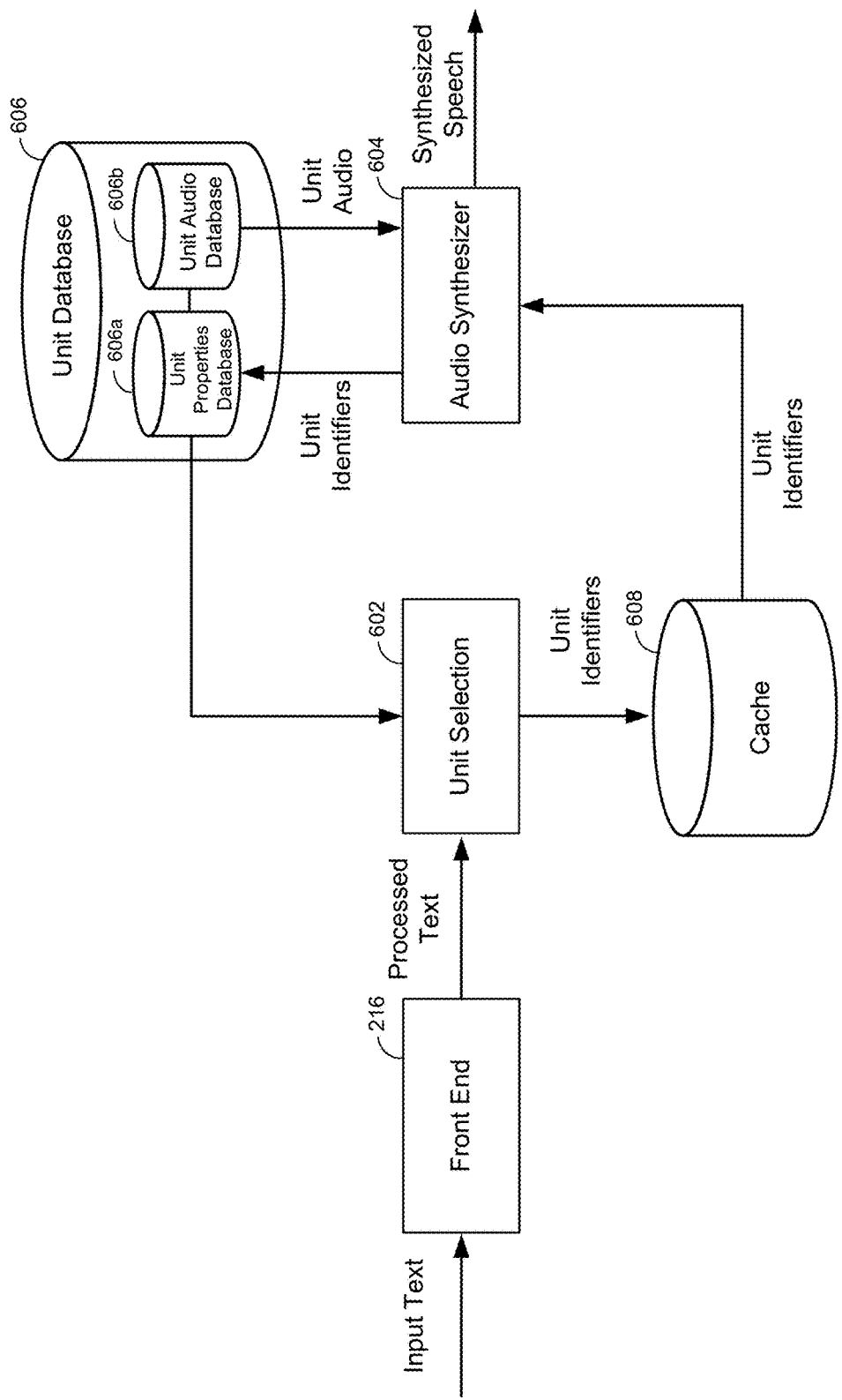

REDUCED LATENCY TEXT-TO-SPEECH SYSTEM

BACKGROUND

Human-computer interactions have progressed to the point where computing devices can render spoken language output to users based on textual sources available to the devices. In such text-to-speech (TTS) systems, a device converts text into an acoustic waveform that is recognizable as speech corresponding to the input text. TTS systems may provide spoken output to users in a number of applications, enabling a user to receive information from a device without necessarily having to rely on tradition visual output devices, such as a monitor or screen. A TTS process may be referred to as speech synthesis or speech generation.

Speech synthesis may be used by computers, hand-held devices, telephone computer systems, kiosks, automobiles, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 4A-4B illustrate speech synthesis using unit selection according to one aspect of the present disclosure.

FIG. 6B illustrates TTS results caching according to one aspect of the present disclosure.

DETAILED DESCRIPTION

Text-to-speech (TTS) processing may involve a distributed system where a user inputs a TTS request into a local device that then sends portions of the request to a remote device, such as a server, for further TTS processing. The remote device may then process the request and return results to the user's local device to be accessed by the user.

While performing distributed TTS processing allows a system to take advantage of the high processing power of remote devices, such as powerful servers, such a system may result in a noticeable delay between when a user submits a TTS request and when speech results begin to be available to the user. This delay may be the result of multiple factors, including the time for transporting data back and forth between a local device and a remote device, the time for pre-processing of a TTS request prior to actual speech synthesis and other factors. As this initial time period may be the most time and computationally intensive, once early TTS results become available (such as speech corresponding to the beginning of the text of a TTS request), there is often no further delay noticeable by a user. This is because once initial results have been computed and delivered, a TTS system can typically process continuing results faster than the user listens to the resulting speech.

Figure 1:
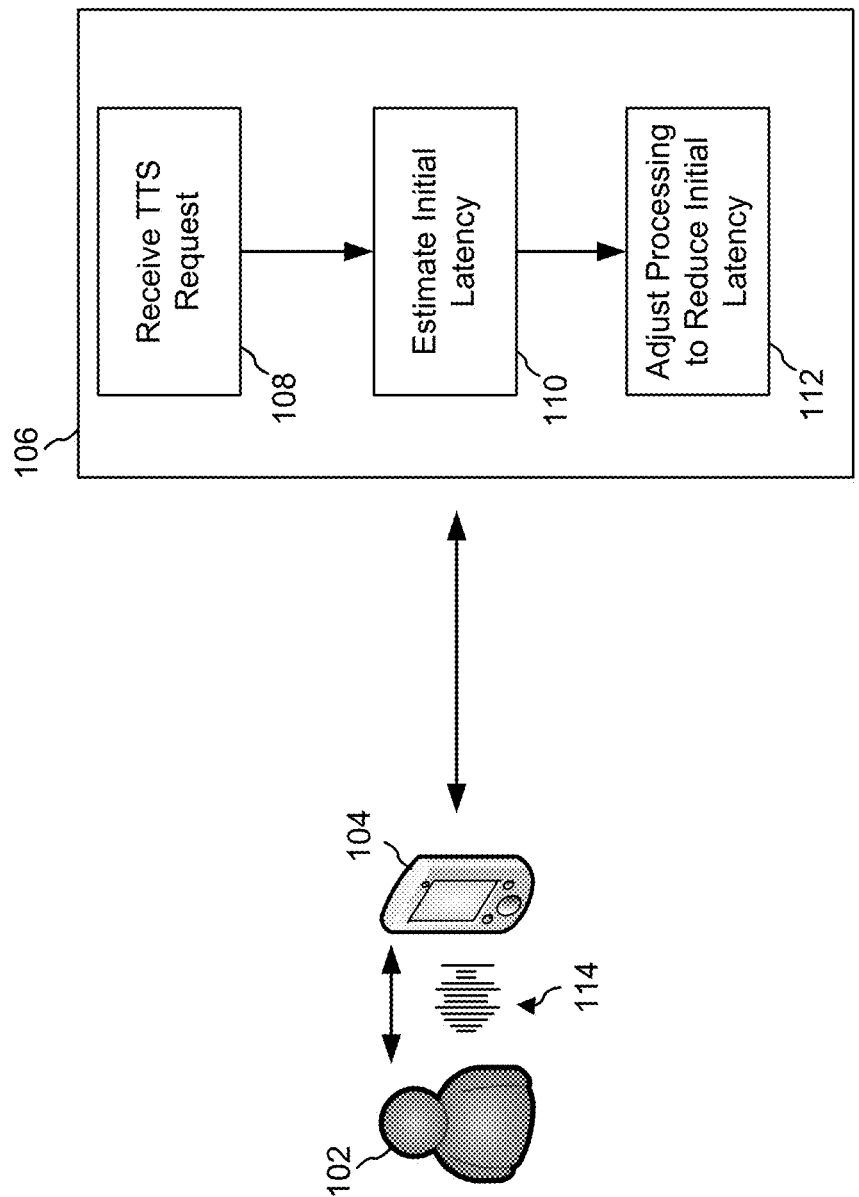
FIG. 1 illustrates reduced latency text-to-speech (TTS) processing according to one aspect of the present disclosure.

From a system perspective, it is desirable to minimize any user noticeable delay. Thus, a system and method is offered to reduce the latency between the submission of a TTS request to the system by a user and the delivery of the beginning of TTS results to the user from the system. FIG. 1 illustrates a system for reducing latency of initial TTS results according to one aspect of the present disclosure. A user 102 submits a TTS request to a local device 104. The local device 104 sends the request to a remote device 106. The remote device 106 receives the TTS request 108. As shown in block 110, the remote device 106 then estimates the initial latency between submission of the TTS request and the beginning of delivery of results 114 to the user 102. If the estimated initial latency is above a threshold, the remote device 106 adjusts TTS processing to reduce initial latency, as shown in block 112. In another aspect, the TTS system is configured to reduce initial latency as a default, and no estimating or comparison to a threshold is performed. A more detailed explanation of a TTS system, along with further details of reducing latency of initial TTS results, follows below.

Figure 2:
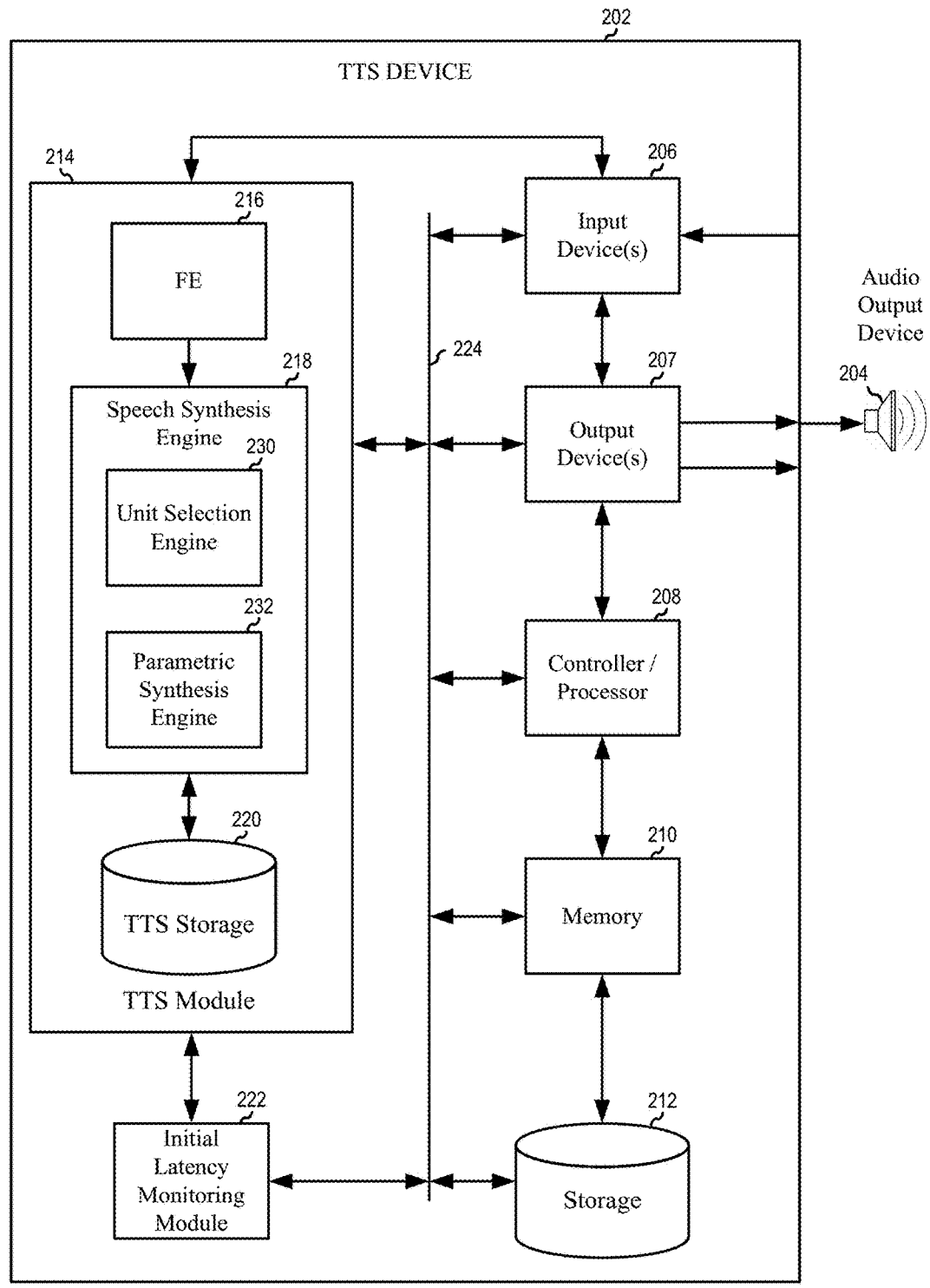
FIG. 2 is a block diagram conceptually illustrating a device for text-to-speech processing according to one aspect of the present disclosure.

FIG. 2 shows a text-to-speech (TTS) device 202 for performing speech synthesis. Aspects of the present disclosure include computer-readable and computer-executable instructions that may reside on the TTS device 202. FIG. 2 illustrates a number of components that may be included in the TTS device 202, however other non-illustrated components may also be included. Also, some of the illustrated components may not be present in every device capable of employing aspects of the present disclosure. Further, some components that are illustrated in the TTS device 202 as a single component may also appear multiple times in a single device. For example, the TTS device 202 may include multiple input devices 206, output devices 207 or multiple controllers/processors 208.

Multiple TTS devices may be employed in a single speech synthesis system. In such a multi-device system, the TTS devices may include different components for performing different aspects of the speech synthesis process. The multiple devices may include overlapping components. The TTS device as illustrated in FIG. 2 is exemplary, and may be a stand-alone device or may be included, in whole or in part, as a component of a larger device or system.

The teachings of the present disclosure may be applied within a number of different devices and computer systems, including, for example, general-purpose computing systems, server-client computing systems, mainframe computing systems, telephone computing systems, laptop computers, cellular phones, personal digital assistants (PDAs), tablet computers, other mobile devices, etc. The TTS device 202 may also be a component of other devices or systems that may provide speech recognition functionality such as automated teller machines (ATMs), kiosks, global position systems (GPS), home appliances (such as refrigerators, ovens, etc.), vehicles (such as cars, busses, motorcycles, etc.), and/or ebook readers, for example.

As illustrated in FIG. 2, the TTS device 202 may include an audio output device 204 for outputting speech processed by the TTS device 202 or by another device. The audio output device 204 may include a speaker, headphone, or other suitable component for emitting sound. The audio output device 204 may be integrated into the TTS device 202 or may be separate from the TTS device 202. The TTS device 202 may also include an address/data bus 224 for conveying data among components of the TTS device 202. Each component within the TTS device 202 may also be directly connected to other components in addition to (or instead of) being connected to other components across the bus 224. Although certain components are illustrated in FIG. 2 as directly connected, these connections are illustrative only and other components may be directly connected to each other (such as the TTS module 214 to the controller/processor 208).

The TTS device 202 may include a controller/processor 208 that may be a central processing unit (CPU) for processing data and computer-readable instructions and a memory 210 for storing data and instructions. The memory 210 may include volatile random access memory (RAM), non-volatile read only memory (ROM), and/or other types of memory. The TTS device 202 may also include a data storage component 212, for storing data and instructions. The data storage component 212 may include one or more storage types such as magnetic storage, optical storage, solid-state storage, etc. The TTS device 202 may also be connected to removable or external memory and/or storage (such as a removable memory card, memory key drive, networked storage, etc.) through the input device 206 or output device 207. Computer instructions for processing by the controller/processor 208 for operating the TTS device 202 and its various components may be executed by the controller/processor 208 and stored in the memory 210, storage 212, external device, or in memory/storage included in the TTS module 214 discussed below. Alternatively, some or all of the executable instructions may be embedded in hardware or firmware in addition to or instead of software. The teachings of this disclosure may be implemented in various combinations of software, firmware, and/or hardware, for example.

The TTS device 202 includes input device(s) 206 and output device(s) 207. A variety of input/output device(s) may be included in the device. Example input devices include an audio output device 204, such as a microphone, a touch input device, keyboard, mouse, stylus or other input device. Example output devices include a visual display, tactile display, audio speakers (pictured as a separate component), headphones, printer or other output device. The input device 206 and/or output device 207 may also include an interface for an external peripheral device connection such as universal serial bus (USB), FireWire, Thunderbolt or other connection protocol. The input device 206 and/or output device 207 may also include a network connection such as an Ethernet port, modem, etc. The input device 206 and/or output device 207 may also include a wireless communication device, such as radio frequency (RF), infrared, Bluetooth, wireless local area network (WLAN) (such as WiFi), or wireless network radio, such as a radio capable of communication with a wireless communication network such as a Long Term Evolution (LTE) network, WiMAX network, 3G network, etc. Through the input device 206 and/or output device 207 the TTS device 202 may connect to a network, such as the Internet or private network, which may include a distributed computing environment.

The device may also include an TTS module 214 for processing textual data into audio waveforms including speech. The TTS module 214 may be connected to the bus 224, input device(s) 206, output device(s) 207 audio output device 204, controller/processor 208 and/or other component of the TTS device 202. The textual data may originate from an internal component of the TTS device 202 or may be received by the TTS device 202 from an input device such as a keyboard or may be sent to the TTS device 202 over a network connection. The text may be in the form of sentences including text, numbers, and/or punctuation for conversion by the TTS module 214 into speech. The input text may also include special annotations for processing by the TTS module 214 to indicate how particular text is to be pronounced when spoken aloud. Textual data may be processed in real time or may be saved and processed at a later time.

The TTS module 214 includes a TTS front end (FE) 216, a speech synthesis engine 218, and TTS storage 220. The FE 216 transforms input text data into a symbolic linguistic representation for processing by the speech synthesis engine 218. The speech synthesis engine 218 compares the annotated phonetic units models and information stored in the TTS storage 220 for converting the input text into speech. The FE 216 and speech synthesis engine 218 may include their own controller(s)/processor(s) and memory or they may use the controller/processor 208 and memory 210 of the TTS device 202, for example. Similarly, the instructions for operating the FE 216 and speech synthesis engine 218 may be located within the TTS module 214, within the memory 210 and/or storage 212 of the TTS device 202, or within an external device.

Text input into a TTS module 214 may be sent to the FE 216 for processing. The front-end may include modules for performing text normalization, linguistic analysis, and linguistic prosody generation. During text normalization, the FE processes the text input and generates standard text, converting such things as numbers, abbreviations (such as Apt., St., etc.), symbols ($, %, etc.) into the equivalent of written out words.

During linguistic analysis the FE 216 analyzes the language in the normalized text to generate a sequence of phonetic units corresponding to the input text. This process may be referred to as phonetic transcription. Phonetic units include symbolic representations of sound units to be eventually combined and output by the TTS device 202 as speech. Various sound units may be used for dividing text for purposes of speech synthesis. A TTS module 214 may process speech based on phonemes (individual sounds), half-phonemes, di-phones (the last half of one phoneme coupled with the first half of the adjacent phoneme), bi-phones (two consecutive phonemes), syllables, words, parts-of-speech (i.e., noun, verb, etc.), phrases, sentences, or other units. Each component of the written language units, such as graphemes, may be mapped to a component of grammatical language units, such as morphemes, which are in turn associated with spoken language units, such as the phonetic units discussed above. Each word of text may be mapped to one or more phonetic units. Such mapping may be performed using a language dictionary stored in the TTS device 202, for example in the TTS storage module 220. The linguistic analysis performed by the FE 216 may also identify different grammatical components such as prefixes, suffixes, phrases, punctuation, syntactic boundaries, or the like. Such grammatical components may be used by the TTS module 214 to craft a natural sounding audio waveform output. The language dictionary may also include letter-to-sound rules and other tools that may be used to pronounce previously unidentified words or letter combinations that may be encountered by the TTS module 214. Generally, the more information included in the language dictionary, the higher quality the speech output.

Based on the linguistic analysis the FE 216 may then perform linguistic prosody generation where the phonetic units are annotated with desired prosodic characteristics, also called acoustic features, which indicate how the desired phonetic units are to be pronounced in the eventual output speech. During this stage the FE 216 may consider and incorporate any prosodic annotations that accompanied the text input to the TTS module 214. Such acoustic features may include pitch, energy, duration, and the like. Application of acoustic features may be based on prosodic models available to the TTS module 214. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, prosodic model with more information may result in higher quality speech output than prosodic models with less information.

The output of the FE 216, referred to as a symbolic linguistic representation, may include a sequence of phonetic units annotated with prosodic characteristics. This symbolic linguistic representation may be sent to a speech synthesis engine 218, also known as a synthesizer, for conversion into an audio waveform of speech for output to an audio output device 204 and eventually to a user. The speech synthesis engine 218 may be configured to convert the input text into high-quality natural-sounding speech in an efficient manner. Such high-quality speech may be configured to sound as much like a human speaker as possible, or may be configured to be understandable to a listener without attempts to mimic a precise human voice.

A speech synthesis engine 218 may perform speech synthesis using one or more different methods. In one method of synthesis called unit selection, described further below, a unit selection engine 230 matches a database of recorded speech against the symbolic linguistic representation created by the FE 216. The unit selection engine 230 matches the symbolic linguistic representation against spoken audio units in the database. Matching units are selected and concatenated together to form a speech output. Each unit includes an audio waveform corresponding with a phonetic unit, such as a short .wav file of the specific sound, along with a description of the various acoustic features associated with the .wav file (such as its pitch, energy, etc.), as well as other information, such as where the phonetic unit appears in a word, sentence, or phrase, the neighboring phonetic units, etc. Using all the information in the unit database, a unit selection engine 230 may match units to the input text to create a natural sounding waveform. The unit database may include multiple examples of phonetic units to provide the TTS device 202 with many different options for concatenating units into speech. One benefit of unit selection is that, depending on the size of the database, a natural sounding speech output may be generated. The larger the unit database, the more likely the TTS device 202 will be able to construct natural sounding speech.

In another method of synthesis called parametric synthesis parameters such as frequency, volume, noise, are varied by a parametric synthesis engine 232, digital signal processor or other audio generation device to create an artificial speech waveform output. Parametric synthesis may use an acoustic model and various statistical techniques to match a symbolic linguistic representation with desired output speech parameters. Parametric synthesis may include the ability to be accurate at high processing speeds, as well as the ability to process speech without large databases associated with unit selection, but also typically produces an output speech quality that may not match that of unit selection. Unit selection and parametric techniques may be performed individually or combined together and/or combined with other synthesis techniques to produce speech audio output.

Parametric speech synthesis may be performed as follows. A TTS module 214 may include an acoustic model, or other models, which may convert a symbolic linguistic representation into a synthetic acoustic waveform of the text input based on audio signal manipulation. The acoustic model includes rules which may be used by the parametric synthesis engine 232 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the FE 216.

The parametric synthesis engine 232 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (a digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 218, the state may change or stay the same, based on the processing of the new text. For example, the pronunciation of a previously processed word might change based on later processed words. A Viterbi algorithm may be used to find the most likely sequence of states based on the processed text. The HMMs may generate speech in parameterized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGH vocoder, HNM (harmonic plus noise) based vocoders, CELP (code-excited linear prediction) vocoders, GlottHMM vocoders, HSM (harmonic/stochastic model) vocoders, or others.

Figure 3:
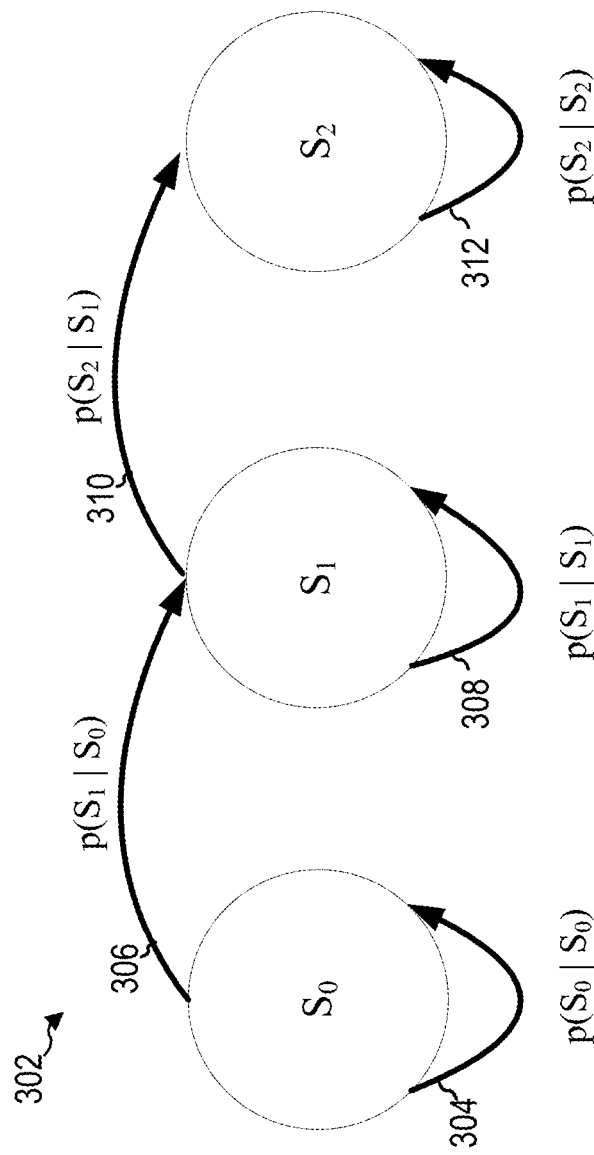
FIG. 3 illustrates speech synthesis using a Hidden Markov Model according to one aspect of the present disclosure.

An example of HMM processing for speech synthesis is shown in FIG. 3. A sample input phonetic unit, for example, phoneme /E/, may be processed by a parametric synthesis engine 232. The parametric synthesis engine 232 may initially assign a probability that the proper audio output associated with that phoneme is represented by state $S_0$ in the Hidden Markov Model illustrated in FIG. 3. After further processing, the speech synthesis engine 218 determines whether the state should either remain the same, or change to a new state. For example, whether the state should remain the same 304 may depend on the corresponding transition probability (written as $P(S_0|S_0)$, meaning the probability of going from state $S_0$ to $S_0$) and how well the subsequent frame matches states $S_0$ and $S_1$. If state $S_1$ is the most probable, the calculations move to state $S_1$ and continue from there. For subsequent phonetic units, the speech synthesis engine 218 similarly determines whether the state should remain at $S_1$, using the transition probability represented by $P(S_1|S_1)$ 308, or move to the next state, using the transition probability $P(S_2|S_1)$ 310. As the processing continues, the parametric synthesis engine 232 continues calculating such probabilities including the probability 312 of remaining in state $S_2$ or the probability of moving from a state of illustrated phoneme /E/ to a state of another phoneme. After processing the phonetic units and acoustic features for state $S_2$, the speech recognition may move to the next phonetic unit in the input text.

The probabilities and states may be calculated using a number of techniques. For example, probabilities for each state may be calculated using a Gaussian model, Gaussian mixture model, or other technique based on the feature vectors and the contents of the TTS storage 220. Techniques such as maximum likelihood estimation (MLE) may be used to estimate the probability of particular states.

In addition to calculating potential states for one audio waveform as a potential match to a phonetic unit, the parametric synthesis engine 232 may also calculate potential states for other potential audio outputs (such as various ways of pronouncing phoneme /E/) as potential acoustic matches for the phonetic unit. In this manner multiple states and state transition probabilities may be calculated.

The probable states and probable state transitions calculated by the parametric synthesis engine 232 may lead to a number of potential audio output sequences. Based on the acoustic model and other potential models, the potential audio output sequences may be scored according to a confidence level of the parametric synthesis engine 232. The highest scoring audio output sequence, including a stream of parameters to be synthesized, may be chosen and digital signal processing may be performed by a vocoder or similar component to create an audio output including synthesized speech waveforms corresponding to the parameters of the highest scoring audio output sequence and, if the proper sequence was selected, also corresponding to the input text.

Unit selection speech synthesis may be performed as follows. Unit selection includes a two-step process. A unit selection engine 230 first determines what speech units to use and then combines them so that the particular combined units match the desired phonemes and acoustic features and create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well a given speech unit matches the linguistic features of a desired speech output (such as pitch, prosody, accents, stress, syllable position, word position, etc.). A join cost represents how well a speech unit matches a consecutive speech unit for purposes of concatenating the speech units together in the eventual synthesized speech. A unit's fundamental frequency (f0), spectrum, energy, and other factors, as compared to those factors of a potential neighboring unit may all effect the join cost between the units. The overall cost function is a combination of target cost, join cost, and other costs that may be determined by the unit selection engine 230. As part of unit selection, the unit selection engine 230 chooses the speech unit with the lowest overall combined cost. For example, a speech unit with a very low target cost may not necessarily be selected if its join cost is high.

A TTS device 202 may be configured with a speech unit database for use in unit selection. The speech unit database may be stored in TTS storage 220, in storage 212, or in another storage component. The speech unit database includes recorded speech utterances with the utterances' corresponding text aligned to the utterances. The speech unit database may include many hours of recorded speech (in the form of audio waveforms, feature vectors, or other formats), which may occupy a significant amount of storage in the TTS device 202. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 218 may attempt to select a unit in the speech unit database that most closely matches the input text (including both phonetic units and prosodic annotations). Generally the larger the speech unit database the better the speech synthesis may be achieved by virtue of the greater number of unit samples that may be selected to form the precise desired speech output.

Figure 4B:
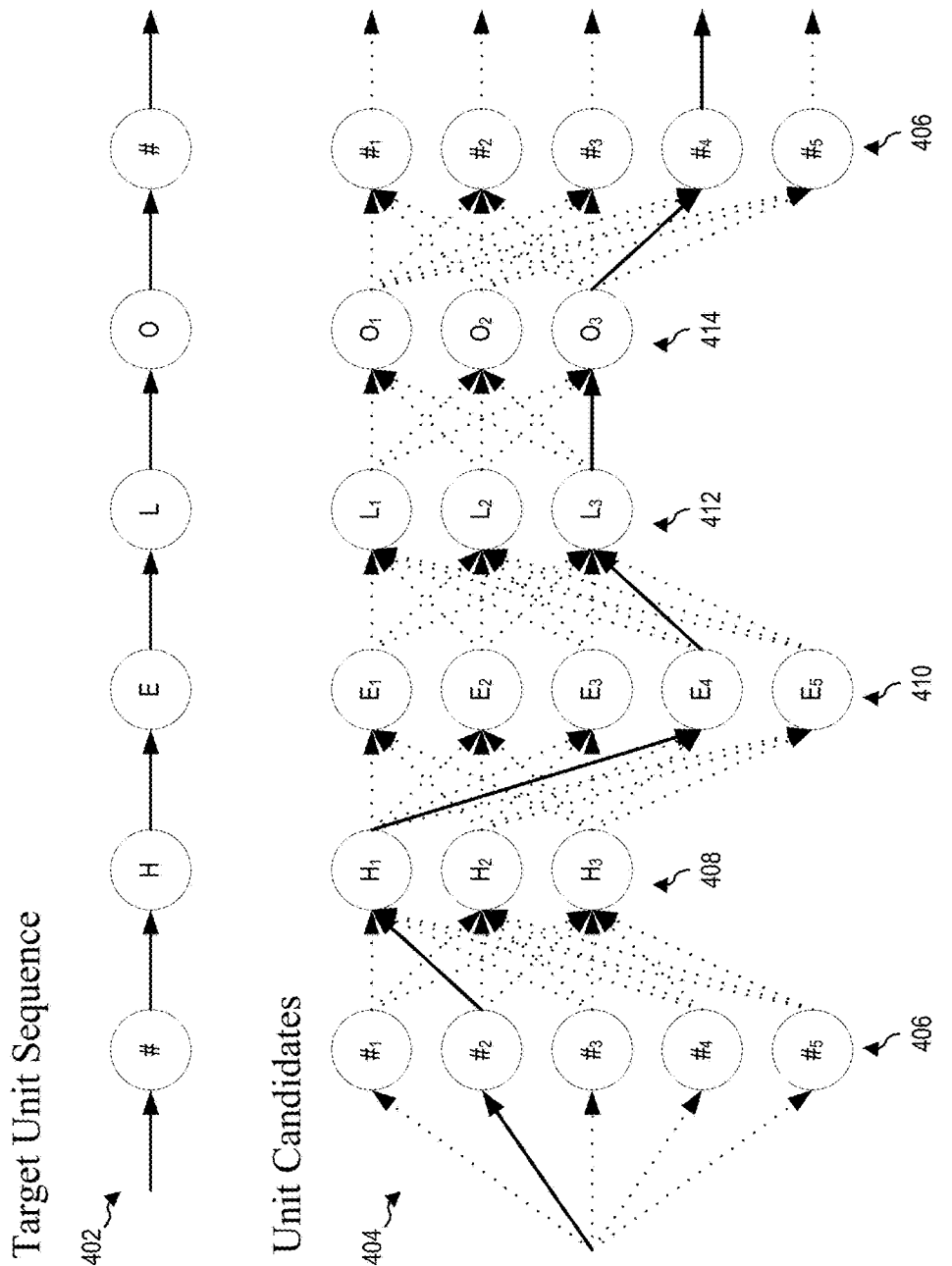

For example, as shown in FIG. 4A, a target sequence of phonetic units 402 to synthesize the word "hello" is determined by the unit selection engine 230. A number of candidate units 404 may be stored in the TTS storage 220. Although phonemes are illustrated in FIG. 4A, other phonetic units, such as diphones, may be selected and used for unit selection speech synthesis. For each phonetic unit there are a number of potential candidate units (represented by columns 406, 408, 410, 412 and 414) available. Each candidate unit represents a particular recording of the phonetic unit with a particular associated set of acoustic features. The unit selection engine 230 then creates a graph of potential sequences of candidate units to synthesize the available speech. The size of this graph may be variable based on certain device settings. An example of this graph is shown in FIG. 4B. A number of potential paths through the graph are illustrated by the different dotted lines connecting the candidate units. A Viterbi algorithm may be used to determine potential paths through the graph. Each path may be given a score incorporating both how well the candidate units match the target units (with a high score representing a low target cost of the candidate units) and how well the candidate units concatenate together in an eventual synthesized sequence (with a high score representing a low join cost of those respective candidate units). The unit selection engine 230 may select the sequence that has the lowest overall cost (represented by a combination of target costs and join costs) or may choose a sequence based on customized functions for target cost, join cost or other factors. The candidate units along the selected path through the graph may then be combined together to form an output audio waveform representing the speech of the input text. For example, in FIG. 4B the selected path is represented by the solid line. Thus units $\#_2$, $H_1$, $E_4$, $L_3$, $O_3$, and $\#_4$ may be selected to synthesize audio for the word "hello."

Audio waveforms including the speech output from the TTS module 214 may be sent to an audio output device 204 for playback to a user or may be sent to the output device 207 for transmission to another device, such as another TTS device 202, for further processing or output to a user. Audio waveforms including the speech may be sent in a number of different formats such as a series of feature vectors, uncompressed audio data, or compressed audio data.

Other information may also be stored in the TTS storage 220 for use in speech recognition. The contents of the TTS storage 220 may be prepared for general TTS use or may be customized to include sounds and words that are likely to be used in a particular application. For example, for TTS processing by a global positioning system (GPS) device, the TTS storage 220 may include customized speech specific to location and navigation. In certain instances the TTS storage 220 may be customized for an individual user based on his/her individualized desired speech output. For example a user may prefer a speech output voice to be a specific gender, have a specific accent, speak at a specific speed, have a distinct emotive quality (e.g., a happy voice), or other customizable characteristic. The speech synthesis engine 218 may include specialized databases or models to account for such user preferences. A TTS device 202 may also be configured to perform TTS processing in multiple languages. For each language, the TTS module 214 may include specially configured data, instructions and/or components to synthesize speech in the desired language(s). To improve performance, the TTS module 214 may revise/update the contents of the TTS storage 220 based on feedback of the results of TTS processing, thus enabling the TTS module 214 to improve speech recognition beyond the capabilities provided in the training corpus.

Figure 5:
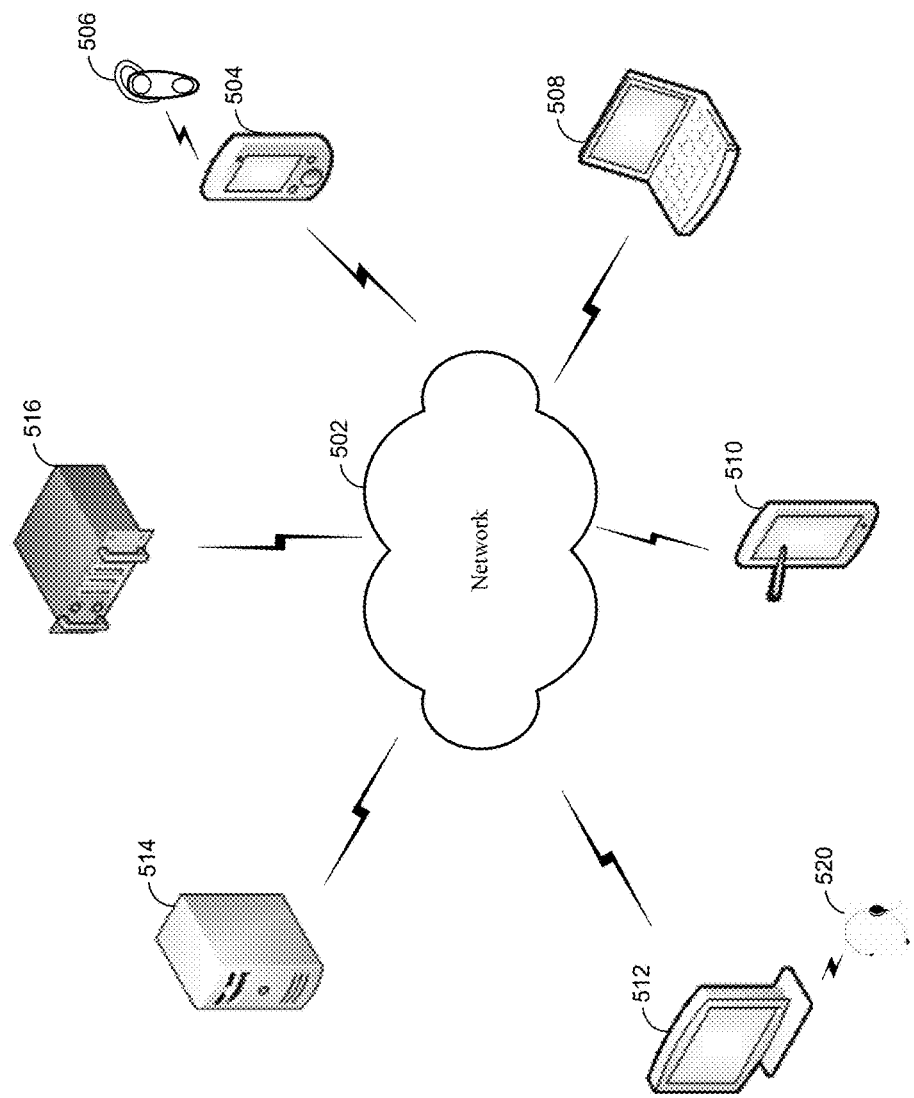
FIG. 5 illustrates a computer network for use with text-to-speech processing according to one aspect of the present disclosure.

Multiple TTS devices 202 may be connected over a network. As shown in FIG. 5 multiple devices may be connected over network 502. Network 502 may include a local or private network or may include a wide network such as the internet. Devices may be connected to the network 502 through either wired or wireless connections. For example, a wireless device 504 may be connected to the network 502 through a wireless service provider. Other devices, such as computer 512, may connect to the network 502 through a wired connection. Other devices, such as laptop 508 or tablet computer 510 may be capable of connection to the network 502 using various connection methods including through a wireless service provider, over a WiFi connection, or the like. Networked devices may output synthesized speech through a number of audio output devices including through headsets 506 or 520. Audio output devices may be connected to networked devices either through a wired or wireless connection. Networked devices may also include embedded audio output devices, such as an internal speaker in laptop 508, wireless device 504 or table computer 510.

In certain TTS system configurations, a combination of devices may be used. For example, one device may receive text, another device may process text into speech, and still another device may output the speech to a user. For example, text may be received by a wireless device 504 and sent to a computer 514 or server 516 for TTS processing. The resulting speech audio data may be returned to the wireless device 504 for output through headset 506. Or computer 512 may partially process the text before sending it over the network 502. Because TTS processing may involve significant computational resources, in terms of both storage and processing power, such split configurations may be employed where the device receiving the text/outputting the processed speech may have lower processing capabilities than a remote device and higher quality TTS results are desired. The TTS processing may thus occur remotely with the synthesized speech results sent to another device for playback near a user.

In such a distributed TTS system, requests from local devices may go to one or more remote devices for processing. One benefit to such a distributed system is that remote devices, such as TTS servers, may be significantly more powerful than local devices, which may be small mobile devices carried by users. The more powerful remote devices allow the dedication of significant processing resources to the computationally intensive task of synthesizing speech from text. One drawback to such systems, is that due to the time it takes for data to be transported back and forth between a local device and remote device, combined with the time it takes to perform initial processing of a TTS request, may result in a noticeable delay between when a user submits a TTS request and when initial results are available. This delay is referred to here as initial results latency.

One characteristic of certain TTS processing systems is that while initial results latency may be noticeable to the user, once results begin to become available, there typically is no noticeable delay during the delivery of TTS results. For example, if a user submits a paragraph of text for TTS processing, the most noticeable delay from the user point of view is the time between submission of the request and the beginning of speech output. Once the speech begins, assuming no breakdown in communication, the system typically can delivery results from a remote device to the user's local device faster than the user listens to the results. Thus, to reduce noticeable delay to a user, it may be desirable to reduce initial results latency.

Offered are techniques for reducing initial results latency. The techniques offered here may be implemented independently or in various combinations. Further, unless explicitly stated otherwise, the techniques may be performed on a combination of devices, such as on a remote device and a local device, on a combination of remote devices, on multiple remote devices and a single local device, etc. A TTS device 202 may include a component such as an initial latency monitoring module 222 for monitoring the initial latency when processing and returning TTS requests to a user. The initial latency monitoring module 222 may reside on a local device and/or on a remote device, and may monitor initial latency as well as control steps, such as those described below, to reduce initial latency.

In one aspect, a TTS processing system will, for an early portion of a TTS request, use predetermined units for speech synthesis, thereby skipping the time consuming process of performing the Viterbi algorithm to identify specific units corresponding to the text of the early portion of the TTS request. Once those predetermined units have been determined, the TTS processing system may cache indices of the units for concatenation, rather than caching actual speech results during TTS processing. This skipping of the Viterbi algorithm and caching of unit indices will free up processor resources and allow the system to more quickly deliver initial TTS results. Caching of speech results may be done for a number of reasons, including storing speech result portions prior to those portions being ready for delivery to a user, keeping a record of previously processed speech in case a user requests the results again, use in system training and the like. Caching, however, as presently implemented, is resource intensive, as is the Viterbi search.

Figure 6A:
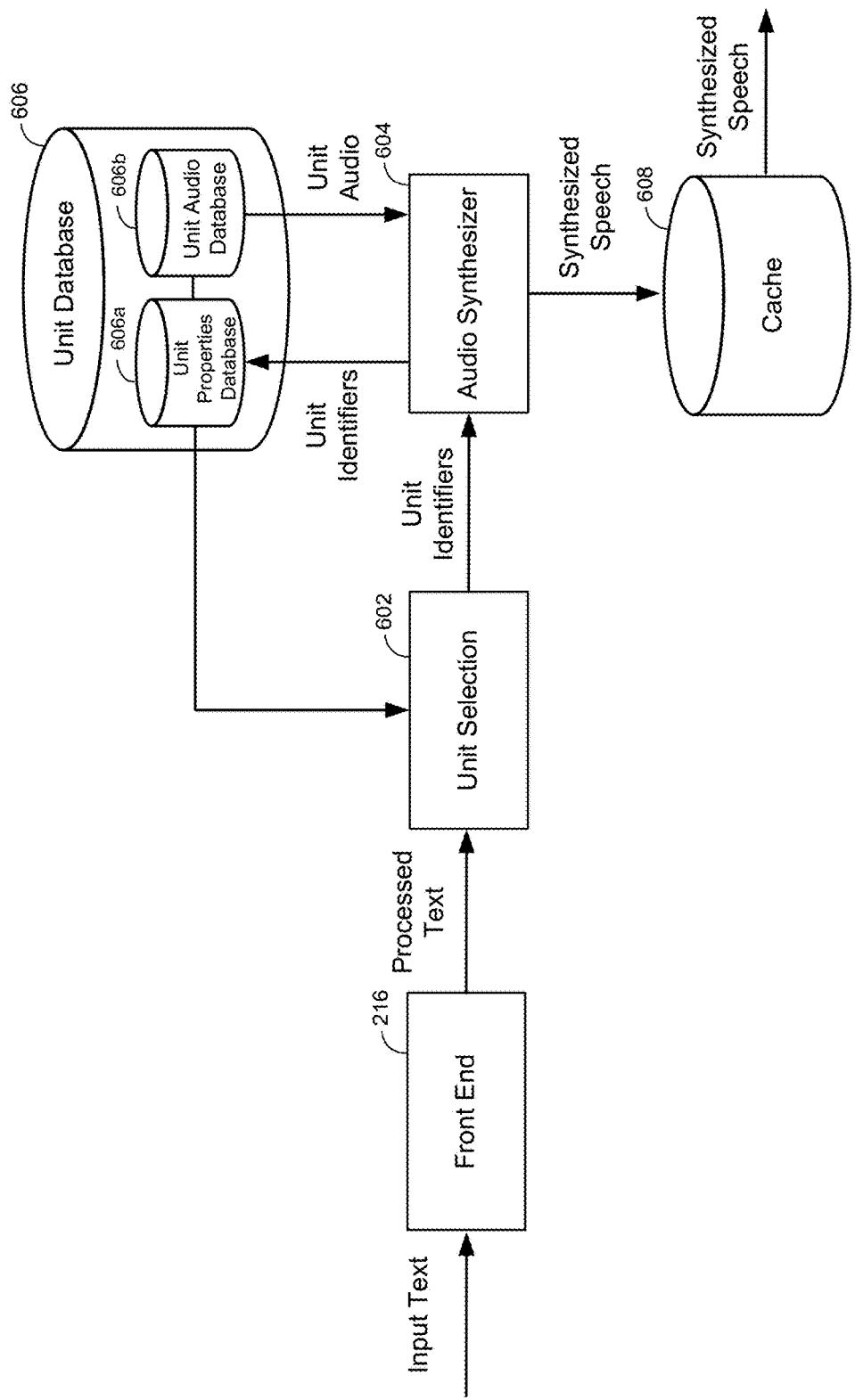
FIG. 6A illustrates TTS results caching for traditional TTS processing.

A typical TTS system operates as shown in FIG. 6A. Text of a TTS request is input to a TTS front end 216, which processes the text and sends it to a unit selection component 602. The unit selection component 602, which may be part of a unit selection engine 230, performs unit selection using a Viterbi algorithm and/or other techniques to determine which units from the unit database 606 should be concatenated to synthesize speech corresponding to the text of the TTS request. The unit database 606 may be part of the TTS storage 220, storage 212 or other storage. The unit database 606 may include a unit properties database 606a and a unit audio database 606b. The unit properties database 606a and unit audio database 606b may be connected. The unit properties database 606a may store acoustic, linguistic, and other properties of each unit along with an identifier corresponding to each respective unit. The unit audio database 606b stores the actual audio for each unit. The unit selection component 602 uses data from the unit properties database 606a to determine which units should be used for speech synthesis. Once the units are determined, the unit selection component passes the unit identifiers to an audio synthesizer 604. The audio synthesizer may be part of a unit selection engine 230. The unit identifiers may be indices which indicate the location of the audio for the individual units in the unit audio database 606b or the unit identifiers may be another form of identifier of the individual units. The audio synthesizer 604 then uses the unit identifiers to obtain the audio samples of the units from the unit audio database 606b and concatenates the audio into a stream of synthesized speech. The synthesized speech is then passed to a cache 608 that may be part of the TTS storage 220, storage 212 or other storage. The cached speech is then sent from the cache 208 to the next downstream location. Alternatively, synthesized speech may be sent to a downstream location at the same time the synthesized speech is sent to the cache. The speech may be sent over a network to the eventual delivery destination which may be a user's local device, a temporary storage location or some other destination. Alternatively the cached speech may be stored for eventual pickup or delivery to a recipient. Alternatively, if the cache is located on a local device, the speech may be output to a microphone for playback to a user.

In order to perform the speech synthesis process described above individual units must be selected that corresponding to the text to be synthesized. The unit selection process typically involves a Viterbi algorithm to choose which individual units to be selected based on how well they match the sounds of the words of the text, how well they join together, and other factors discussed above. Operating the Viterbi algorithm is computationally intensive such that performing the text pre-processing and Viterbi algorithm for an initial portion of text leads to an initial latency noticeable to a user. The Viterbi algorithm and other speech synthesis processes, however, are faster than speech playback such that once speech playback begins, the process of speech synthesis can keep up with the speech playback and latency during playback is typically not noticeable to a user.

Thus, one method to reduce initial latency is to skip the Viterbi algorithm for a first portion of a textual input and use a group of predetermined units for speech synthesis of a first portion of a textual input. In this manner, the time and computing resources spent executing the Viterbi algorithm for the first portion of a textual input may be spent on other tasks, such as executing the Viterbi algorithm for a second (and later) portion(s) of a textual input. In this aspect, the predetermined units are identified by unit identifiers (such as indices of the units) which may be used to locate the audio of the units in a unit database. The audio of those predetermined units is then retrieved, synthesized and output in lieu of performing full unit selection and synthesis for the first portion of the textual input. After the first portion of text is synthesized in this manner, later portions may be synthesized in a traditional manner.

To skip the Viterbi algorithm for the first portion of textual input, a table of stored predetermined units is created. The table may be created ahead of time and installed in a TTS system, may be created dynamically by a device (which may or may not be one of the TTS devices performing TTS processing of the text in question), or may be a combination of created ahead of time and adjusted dynamically. To create the table a number of textual inputs and identifiers of the units corresponding to synthesizing that text are stored. In one aspect, the system may store text that frequently begins TTS requests. For example, text such as "Welcome.", "Hello.", "I'm processing your request.", etc. may be table in the catalog. Each sample text section is associated with certain units that are used to synthesize the respective sample text section, as previously determined by a TTS system (or previously programmed into the TTS system). Each sample text section may then be stored with the unit identifiers corresponding to the sample text section.

Once the table is created, during runtime the TTS system may compare an incoming text request with the text samples stored in the table. If a portion, such as a first portion, of the incoming text request matches a text sample stored in the table, then the TTS system may take the unit identifiers corresponding the matching text sample and perform speech synthesis based on those preselected unit identifiers rather than performing a full Viterbi search to identify units from scratch for that first portion of the text request. Thus, a first portion of synthesized speech may be available for output significantly sooner than would otherwise have been available had traditional unit identification been performed for that first portion of the text request. Computing resources that would otherwise have been spent identifying units for the first portion may be reallocated to other tasks, such as identifying units for a second, or later, portion of the text request. The unit identifiers for the units of the predetermined samples may be cached for easy access by the TTS system.

In other aspects, the first portion of the TTS request may be synthesized without matching the text of the TTS request with the text samples. For example, the TTS system may insert audio corresponding to a stored text sample ahead of audio corresponding to the text of the TTS request. In this manner initial latency will be reduced (because the audio of the text sample is faster to synthesize than the audio for the TTS request) but additional content will be inserted into the audio stream ahead of the desired audio. In another example, a text sample may be chosen to substitute for an early portion of the TTS request based on an application the TTS request is received from without performing the matching. Such as, if TTS requests from weather application frequently begin with a phrase such as "The weather forecast for today.", that phrase may be included in the sample table (along with the corresponding identifiers for phonetic units to synthesize the phrase) and the phrase may be substituted for a first portion of an incoming TTS request without necessarily checking the text of the TTS request to see if that text matches the text sample. In another example, other speech may be prepended to TTS results such as "please wait for your results", "I am currently processing", etc. In this manner, a text sample may be chosen for a TTS request based on a number of factors such as the application which originates the TTS request, the identity of a user originating the TTS request and/or chosen to receive the synthesized audio, the time/date of the TTS request (which may be correlated to the user of certain text corresponding to stored text samples), the location of the remote device to which the TTS results will ultimately be delivered, etc.

FIG. 6B shows TTS result caching according to one aspect of the present disclosure. As shown in FIG. 6B, text is input to a TTS front end 216, which processes the text and sends it to the unit selection component 602. The unit selection component 602 performs unit selection using data from the unit properties database 606a to determine which units from the unit database 606 should be concatenated to synthesize speech corresponding to a TTS request. In this aspect the unit selection component 602 skips the traditional Viterbi algorithm to identify units for the early portion of the TTS request and, as described above, chooses a predetermined set of units to be synthesized for the early portion of the TTS request. The identifiers of those units, along with the order in which they should be concatenated, may be stored in the cache 608. The audio synthesizer 604 then uses the unit identifiers from the cache 608 to obtain the audio samples of the units from the unit audio database 606b, concatenates them into speech and passes the speech onto its delivery point. Such delivery points may be to a recipient over a network or sent to another destination, such as temporary storage, a microphone for output to a user, etc. In this manner, computing resources may be dedicated to actually synthesizing the early portions of speech for delivery as fast as possible. The caching system of FIG. 6B may reduce initial results latency as compared to the caching system of FIG. 6A.

In another aspect, instead of caching unit identifiers for an entire TTS request, only units for the early portions of the TTS request are cached. For example, if a TTS request is a book chapter, the TTS system may only cache a first few sentences. After processing of those first few sentences, the TTS system has likely caught up to the speech delivery and may continue speech synthesis without caching. The system may be configured to heuristically determine the length of the TTS results to cache for each TTS request. In another aspect, the caching systems of FIGS. 6A and 6B may be combined, where the TTS system employs the caching system of FIG. 6B until certain initial results are delivered, and then switches to a caching system of FIG. 6A.

In another aspect, to reduce initial results latency, processing of a TTS request may divided between multiple processors and/or servers, where the most powerful or higher priority computing resources are allocated to the earliest portion of the TTS request. The powerful computing resources (such as powerful servers, faster processing configurations, high priority processes, etc.) may be designated to handle the pre-processing of a TTS request and synthesis of the early portions of text. Less powerful or lower priority computing resources may then be allocated to perform the remainder of the speech synthesis. In this manner a first portion of TTS results may be processed and delivered faster than if less powerful resources were allocated to the early portions of the TTS request. In another aspect, a server may be configured to prioritize initial TTS computations over other processes to reduce initial results latency.

In another aspect, TTS results may be delivered to a secondary delivery location rather than streaming speech results directly to a user. For example, if a user submits a TTS request in advance of when results are needed, an indication may be sent to the user (for example by email, text message, SQS/SNS notification, etc.) that results are ready once the first portion of TTS results has been processed. That first portion of TTS results may then be placed at the secondary delivery location and later joined by the results from processing the second portion, third portion and so on. In this manner the system notifies the user of results as soon as the first portion is ready, rather than waiting until the entire TTS request is processed. Even if the user accesses the TTS results before the later portions are ready, the TTS system will catch up and deliver the later portions before those portions would be queued up to be played for the user.

In another aspect, the TTS system may employ a smaller unit database, Viterbi beam search, or partitioned candidate unit graph to speed TTS processing of early TTS portions. These techniques are described in U.S. patent application Ser. No. 13/929,104, filed Jun. 27, 2013, entitled "ADJUSTABLE TTS DEVICES" in the names of Kaszczuk, et al., the disclosure of which is hereby incorporated by reference in its entirety. While employing such techniques may reduce TTS quality, they may also speed processing. Such techniques may be employed only for early TTS results. Once initial results have been delivered, the TTS system may resume normal TTS processing to improve the quality of later results.

In another aspect, initial TTS processing may be performed by a local TTS device, such as the user's device. The local device may be configured with a reduced size unit database to handle initial TTS results. One method of performing distributed TTS processing on a local device is described in U.S. patent application Ser. No. 13/740,762, filed Jan. 14, 2013, entitled "DISTRIBUTED SPEECH UNIT INVENTORY FOR TTS SYSTEMS" in the names of Osowski, et al., the disclosure of which is hereby incorporated by reference in its entirety. While performing TTS processing on a local device may not provide the same quality of results as processing by the typically more powerful remote devices, performing early TTS processing by the local device may reduce initial results latency. Once initial results have been delivered, the TTS system may resume normal TTS processing to improve the quality of later results.

In one aspect, a TTS system may employ one or more of the above techniques as part of its normal operation, thus actively employing latency reducing techniques without necessarily monitoring or estimating initial latency. In another aspect, the TTS system may monitor initial results latency for TTS requests and activate one or more of the above techniques if initial results latency exceeds a determined threshold. In other aspect, the TTS system may estimate initial results latency and activate one or more of the above techniques if initial results latency is estimated to exceed a determined threshold. Initial results latency may be estimated based on a number of a factors, including bandwidth of communications between the user and the remote device, available processing power of the remote device and/or local device, the size and complexity of the TTS request, and the like. In another aspect, the resources dedicated to processing a first portion of TTS results may be based on the estimating. For example, for higher estimates of initial results latency more or more powerful resources may be dedicated to first portion processing.

Figure 7A:
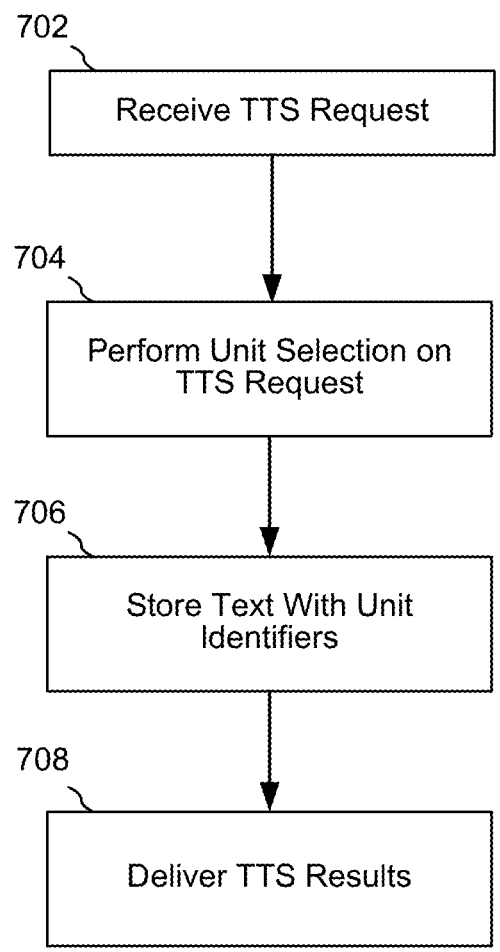
FIG. 7A illustrates configuring text samples and their respective units according to one aspect of the present disclosure.

FIG. 7A illustrates constructing a table for reduced latency TTS processing according to one aspect of the present disclosure. In block 702 a TTS request is received by a TTS system. The TTS system then performs unit selection on the TTS request, as shown in block 704. The system then stores the text along with the unit identifiers, such as indices for a unit database, corresponding to the stored text, as shown in block 706. The text and corresponding unit identifiers may be stored in a cached table of predetermined sample text to be used to match to incoming TTS requests, thereby speeding up initial TTS processing. In one aspect only the text and unit identifiers for a beginning of a TTS request, rather than for an entire TTS request, may be stored.

In another aspect, the table of sample text may be configured as part of installation of the TTS system. In another aspect, the predetermined table of sample text may be dynamically created and/or adjusted, as shown in FIG. 7A. Following unit selection, the system may complete TTS processing and delivery TTS results, as shown in block 708. The predetermined text samples may then be used to reduce initial latency of TTS processing, as shown in FIG. 7B.

Figure 7B:
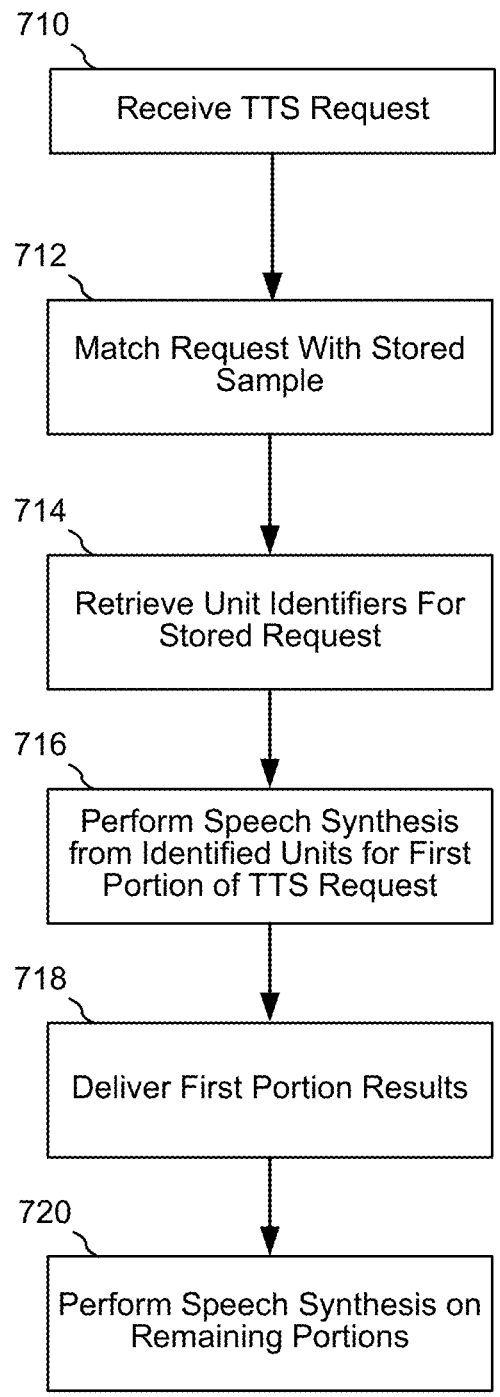
FIG. 7B illustrates reduced latency TTS processing according to one aspect of the present disclosure.

FIG. 7B illustrates reduced latency TTS processing using the text samples according to one aspect of the present disclosure. In block 710, a TTS system receives a TTS request. The TTS system then matches the first portion of the TTS request with the stored text samples, as shown in block 712. The TTS system then retrieves the unit identifiers corresponding to the matching text sample from the cache, as shown in block 714. The TTS system then performs speech synthesis on the first portion of text using the retrieved unit identifiers, as shown in block 716. The TTS system then delivers the results of the speech synthesis of the first portion to a user, as shown in block 718. The TTS system then performs speech synthesis on the remaining portions of the TTS request, as shown in block 720. The remaining portions may be processed in the same manner as the early portions or may be processed in a manner that obtains higher quality results in a manner that reduces delays noticeable to the user.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. For example, the TTS techniques described herein may be applied to many different languages, based on the language information stored in the TTS storage.

Aspects of the present disclosure may be implemented as a computer implemented method, a system, or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid state memory, flash drive, removable disk, and/or other media.

Aspects of the present disclosure may be performed in different forms of software, firmware, and/or hardware. Further, the teachings of the disclosure may be performed by an application specific integrated circuit (ASIC), field programmable gate array (FPGA), or other component, for example.

Aspects of the present disclosure may be performed on a single device or may be performed on multiple devices. For example, program modules including one or more components described herein may be located in different devices and may each perform one or more aspects of the present disclosure. As used in this disclosure, the term "a" or "one" may include one or more items unless specifically stated otherwise. Further, the phrase "based on" is intended to mean "based at least in part on" unless specifically stated otherwise.

What is claimed is:

1. A method for reducing a time for delivery of initial results of text-to-speech (TTS) processing, comprising:
   receiving a TTS request including text for TTS processing, the text comprising a first portion of the text and a second portion of the text and wherein the first portion corresponds to a beginning of the text;
   matching the first portion of text to text of a previously stored text sample;
   retrieving speech unit identifiers associated with the previously stored text sample;
   identifying speech units associated with the speech unit identifiers;
   retrieving audio corresponding to the speech units;
   generating first audio data by synthesizing first speech corresponding to the first portion of the text using the retrieved audio;
   providing the first audio data;
   generating second audio data by synthesizing second speech corresponding to the second portion of the text using a unit selection TTS technique; and
   providing the second audio data.

2. The method of claim 1, further comprising allocating increased computing resources to processing of the first portion of the text than to the second portion of the text.

3. The method of claim 1, further comprising:
   estimating a time for delivery of initial results corresponding to the TTS request to a user; and
   determining that the time for delivery exceeds a threshold, and wherein the matching is performed based at least in part on the determining.

4. A method comprising:
   receiving a text-to-speech (TTS) request including text for TTS processing;
   identifying a stored text sample corresponding to a first portion of the text;
   retrieving speech unit identifiers associated with the stored text sample;
   identifying speech units associated with the speech unit identifiers;
   retrieving audio corresponding to the speech units;
   synthesizing a first portion of speech based at least in part on the retrieved audio; and
   synthesizing a second portion of speech based at least in part on the text.

5. The method of claim 4, wherein the second portion of speech is synthesized from the text for TTS processing with at least the first portion of text removed.

6. The method of claim 4, wherein the stored text sample is identified from a plurality of candidate stored text samples, and wherein the method further comprises determining a plurality of candidate stored text samples based at least in part on an application originating the TTS request, a popularity of the stored text sample, a user originating the TTS request, an intended user of results for the TTS request, a time associated with the TTS request, or a location for delivery of TTS results.

7. The method of claim 4, wherein the stored text sample is identified from a plurality of candidate stored text samples, wherein the candidate stored text samples are selected based at least in part on a frequency of requests to synthesize text corresponding to the candidate stored text samples.

8. The method of claim 4, further comprising allocating increased computing resources to processing of the first portion of the text than to a second portion of the text.

9. The method of claim 8, wherein the allocating is based at least in part an estimated latency for delivery of the first portion of speech to a user.

10. The method of claim 4, wherein the synthesizing the first portion of speech is performed on a local device.

11. The method of claim 4, wherein the synthesizing the second portion of speech is performed on a remote device.

12. The method of claim 4, further comprising:
estimating a time for delivery of initial results corresponding to the TTS request to a user; and
determining that the time for delivery exceeds a threshold, and wherein the identifying the stored text sample is performed based at least in part on the determining.

13. A system comprising:
at least one processor;
a memory device including instructions operable to be executed by the at least one processor to perform a set of actions, configuring the at least one processor:
to receive a text-to-speech (TTS) request including text for TTS processing;
to identify a stored text sample corresponding to a first portion of the text;
to retrieve speech unit identifiers associated with the stored text sample;
to identify speech units associated with the speech unit identifiers;
to retrieve audio corresponding to the speech units;
to synthesize a first portion of speech based at least in part on the retrieved audio; and
to synthesize a second portion of speech based at least in part on the text.

14. The system of claim 13, wherein the at least one processor is further configured to synthesize the second portion of speech from the text for TTS processing with at least the first portion of text removed.

15. The system of claim 13, wherein the at least one processor is further configured:
to identify the stored text sample from a plurality of candidate stored text samples; and
to determine a plurality of candidate stored text samples based at least in part on an application originating the TTS request, a popularity of the stored text sample, a user originating the TTS request, an intended user of results for the TTS request, a time associated with the TTS request, or a location for delivery of TTS results.

16. The system of claim 13, wherein the at least one processor is further configured to identify the stored text sample from a plurality of candidate stored text samples, wherein the candidate stored text samples are selected based at least in part on a frequency of requests to synthesize text corresponding to the candidate stored text samples.

17. The system of claim 13, wherein the at least one processor is further configured to allocate increased computing resources to processing of the first portion of the text than to a second portion of the text.

18. The system of claim 17, wherein the at least one processor is further configured to allocate based at least in part an estimated latency for delivery of the first portion of speech to a user.

19. The system of claim 13, wherein the at least one processor is further configured to synthesize the first portion of speech on a local device.

20. The system of claim 13, wherein the at least one processor is further configured to synthesize the second portion of speech on a remote device.

21. The system of claim 13, wherein the at least one processor is further configured:
to estimate a time for delivery of initial results corresponding to the TTS request to a user; and
to determine that the time for delivery exceeds a threshold, and to identify the stored text sample based at least in part on the determination.

* * * * *